United States Patent [19]

Takahashi et al.

[11] 4,172,734

[45] Oct. 30, 1979

[54] PRIMER COMPOSITION AND COATING METHOD USING SAID COMPOSITION

[75] Inventors: Minoru Takahashi, Uji; Osamu Ishii, Takatsuki; Masanori Naito; Yoshinobu Kusuhara, both of Osaka; Naofumi Imahigashi, Takatsuki, all of Japan

[73] Assignee: Sekisui Kagaku Kogyo Kabushiki Kaisha, Osaka, Japan

[21] Appl. No.: 825,855

[22] Filed: Aug. 18, 1977

[30] Foreign Application Priority Data

Aug. 23, 1976 [JP] Japan .............................. 51/100796

[51] Int. Cl.$^2$ .............................................. C09D 5/10
[52] U.S. Cl. ................... 106/1.12; 106/1.17; 106/14.21; 106/14.44; 106/287.16
[58] Field of Search ............... 106/1.16, 1.17, 14.21, 106/287.16, 287.17, 287.18, 14.44, 1.12

[56] References Cited

U.S. PATENT DOCUMENTS

| | | | |
|---|---|---|---|
| 3,056,684 | 10/1962 | Lopata et al. | 106/1.17 |
| 3,356,515 | 12/1967 | McGlothlin | 106/14.21 |
| 3,653,930 | 4/1972 | Law et al. | 106/1.17 |

Primary Examiner—Lorenzo B. Hayes
Attorney, Agent, or Firm—Wenderoth, Lind & Ponack

[57] ABSTRACT

A primer coating composition comprising (1) a mixture of more than 50% by weight of aluminum powder and less than 50% by weight of zinc powder, and (2) at least one $C_{1-4}$-alkyl silicate, the weight ratio of (1) to (2) being 60:40 to 95:5. The composition is especially useful as a primer for polyphenylene sulfide resin paints.

9 Claims, No Drawings

PRIMER COMPOSITION AND COATING METHOD USING SAID COMPOSITION

This invention relates to an improved primer composition, that is, a composition used for primer coating in general coating processes, and to a method for coating using the primer composition. The primer composition of this invention is characterized by its superior heat resistance, adhesion and hot water resistance and its especially good stability to sulfur compounds at high temperatures.

In general coating techniques, it is the common practice to apply an undercoat intended primarily for rust-proofness to the surface of a substrate to be coated, and then apply a finish coating to the undercoat. Brush coating and powder coating are among known coating methods. The powder coating method is based on the use of a powdery coating composition, and includes, for example, fluidized bed coating, electrostatic powder coating, spray coating, and plasma spray coating. Powdery coating compositions for finish coating are, for example, those prepared mainly from polyester resins, acrylic resins, epoxy resins, polyethylene resins, vinyl chloride resins, polyamide resins, and polyphenylene sulfide resins. The primer composition of this invention is used for primer coating in general coating processes, and is especially convenient as a primer in the powder coating process. The primer coating obtained by the primer coating composition of this invention is very stable to high heat applied during the coating of the powder coating composition or during the subsequent baking process. In particular, the primer composition of this invention is used conveniently as a primer for a powdery polyphenylene sulfide resin coating composition, and exhibits superior results which are difficult to achieve by other primer compositions.

In recent years, polyphenylene sulfide resins containing a recurring unit of the formula

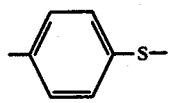

are much used in coating processes because of their superior heat resistance, chemical resistance and mechanical properties, and powdery coating compositions containing these resins are commercially available. The resin may be partially oxidized, or branched, or cross-linked. Also, the coating compositions may contain additives such as silica powder or alumina powder. The particle diameter of the powder is not particularly restricted, but to be suitable for spray coating, it is usually not more than 150 microns, preferably not more than 100 microns.

In the coating of such a polyphenylene sulfide resin, it is necessary to bake the coating at a high temperature of 300° to 450° C., usually 380° to 400° C., and cause its curing reaction to proceed sufficiently in order to obtain a coating having superior properties. However, when a metallic adherend, especially iron, is exposed to such high temperatures, a brittle layer of oxide forms on the surface, and the adhesion of the polyphenylene sulfide resin coating to the metal surface is reduced. This tendency is especially outstanding when the coating is performed by fluidized bed coating. It has also been found that during the baking of the polyphenylene sulfide resin at high temperatures, various sulfur compounds are formed from sulfur components contained in the resin, and degenerate the metal surface, thus adversely affecting the adhesion and water resistance of the resin coating. Hence, in the coating of the polyphenylene sulfide resin, it is necessary to prevent the formation of an oxide layer on the surface of a substrate metal at high temperatures, and to protect the metal surface from sulfur compounds which are generated by the baking of the resin coating. To achieve this, it is necessary to use a primer which has superior heat resistance, can prevent the oxidation of the metal surface at high temperatures, and is stable to sulfur compounds at high temperatures. Organic primers such as epoxy resins which are now in wide use have superior adhesion and water resistance but insufficient heat resistance, and at the time of baking the polyphenylene sulfide resin, the primer layer is degraded. On the other hand, a zinc-rich paint is generally used as an inorganic primer having superior heat resistance and corrosion resistance. Since, however, a dried film of the paint contains as much as 90% by weight of zinc powder, sulfur compounds generated at the time of baking the polyphenylene sulfide resin attack the zinc to form a coating having poor adhesion and water resistance.

According to the present invention, there is provided a primer composition which is free from the defects of the conventional primers, and has superior heat resistance, adhesion and hot water resistance, is stable to sulfur compounds at high temperatures, and is especially effective as a primer for polyphenylene sulfide resins.

The primer composition of this invention and its preferred embodiments are described in detail below.

The primer composition of this invention comprises a mixture of aluminum powder and zinc powder with the proportion of the aluminum powder being larger than 50% by weight, and at least one alkyl silicate which is soluble in organic solvents and in which the alkyl group contains 1 to 4 carbon atoms, the weight ratio of the metal powder to the alkyl silicate being 60:40 to 95:5.

In the metal powder component of the primer composition of this invention, the aluminum powder must be present in an amount of more than 50% by weight. If the amount of the aluminum powder is smaller than this limit, the primer layer is susceptible to attack by sulfur compounds which are generated when a sulfur-containing resin such as a polyphenylene sulfide resin is applied as a finish coating and baked. The primer layer is therefore likely to be deteriorated in adhesion and water resistance. If the amount of the zinc powder is larger than the specified amount, zinc is attacked by hot water to cause the formation of zinc white rust which is a corrosion product containing basic zinc carbonate as a main ingredient. On the other hand, if the amount of the aluminum powder is too large, the rustproofness of the primer coating is likely to be reduced to cause practical disadvantages. Accordingly, the weight ratio of the aluminum powder to the zinc powder is 95:5 to >50:<50, preferably 95:5 to 70:30, especially preferably 95:5 to 80:20.

Even when a polyethylene resin paint, for example, is used as a finishing coat, the amount of the aluminum powder in the metal powder component should be larger than 50% by weight. Zinc has lower water resistance, especially lower hot water resistance, than aluminum, and if the amount of zinc is too large, its adhesion to the polyethylene as a top coat is likely to be reduced. This is because zinc has a higher reactivity with the alkyl silicate component than aluminum, and therefore, if the amount of the zinc powder is too large, the amount of alkyl groups remaining in the alkyl silicate component decreases and the adhesion of the primer to polyethylene decreases.

The aluminum powder and zinc powder used are in the form of fine particles. Preferably, the former has an average particle diameter of not more than 150 microns, and the latter has an average particle diameter of not more than 50 microns. Especially desirable average particle diameters are 50 microns or less for aluminum, and 10 microns or less for zinc.

Suitably, both of the aluminum and zinc powders are granular powders. Flaky powders tend to reduce the strength of the primer layer and cause its peeling, and therefore, cause a reduction in adhesion. Accordingly, even if flaky powders are present, the amount of such powders should not exceed about 10% by weight, preferably 5% by weight, based on the aluminum and zinc powders.

The alkyl silicate component of the primer composition of this invention will be described below.

The alkyl silicate used in the present invention is at least one organic solvent-soluble condensate obtained by partially hydrolyzing at least one tetraalkyl silicate with the alkyl group containing 1 to 4 carbon atoms which is expressed by the following formula

$$Si(OR^1)(OR^2)(OR^3)(OR^4) \qquad (1)$$

wherein $R^1$, $R^2$, $R^3$ and $R^4$, independently from each other, represent an alkyl group containing 1 to 4 carbon atoms.

Examples of the tetraalkyl silicate of formula (1) include tetramethyl silicate, trimethylmonoethyl silicate, dimethyldiethyl silicate, trimethylmonopropyl silicate, trimethylmonobutyl silicate, monomethyltriethyl silicate, tetraethyl silicate, dimethyldibutyl silicate, triethylmonobutyl silicate, triethylmono-tert-butyl silicate, diethyldibutyl silicate, diethyldi-tert-butyl silicate, tetrapropyl silicate, tetraisopropyl silicate, monoethyltributyl silicate, diisopropyldibutyl silicate, monoisopropyltriisobutyl silicate, monoisopropyl-tritert-butyl silicate, tri-sec-butylmono-tert-butyl silicate, tetrabutyl silicate, tetraisobutyl silicate, tetra-sec-butyl silicate, and tetra-tert-butyl silicate. Among these, tetraethyl silicate is especially preferred.

The condensate is a tetraalkyl silicate condensate soluble in organic solvents, which is obtained by partially hydrolyzing the tetraalkyl silicate of formula (1) in an organic solvent in the presence of a suitable catalyst such as hydrochloric acid using water in an amount required for partial hydrolysis.

The above condensate is obtained, for example, by the following procedure. The tetraalkyl silicate of formula (1) is dissolved in an organic solvent such as ethyl alcohol, isopropyl alcohol, isobutyl alcohol, polyethylene glycol, ethylene glycol monoethyl ether, ethylene glycol monobutyl ether, and ethylene glycol monoethyl ether acetate, and an acid such as hydrochloric acid is added to adjust the pH of the solution to 1.5–4.0. Then, with stirring, a predetermined amount of water is added to the solution. With the progress of the reaction, the temperature rises. When there is no further rise in temperature, the reaction ends to afford the condensate. The condensation reaction may be performed in a single stage or a plurality of stages. The total amount of water used in the condensation reaction is 0.25 to 0.99 equivalent based on the tetraalkyl silicate. When the amount of water is less than 0.25 equivalent, the unreacted tetraalkyl silicate remains, and if it exceeds 0.99 equivalent, moisture in the air is absorbed during the reaction, and more than 1 equivalent of water reacts to hydrolyze the tetraalkyl silicate completely. This is likely to precipitate solid silica. The preferred amount of water is 0.4 to 0.9 equivalent, especially preferably 0.6 to 0.8 equivalent.

The especially preferred condensate is a condensate of tetraethyl silicate.

If alkyl silicates having higher alkyl groups are utilized as a primer, the drying time and the curing time of the primer become too long, and are not suitable for practical purposes. Furthermore, such high alkyl silicates have a low content of silica, and therefore, must be used in great quantities in order to obtain superior results. Thus, the use of the higher alkyl silicates is economically disadvantageous.

Organic solvents in which the partial hydrolysis of the tetraalkyl silicate is carried out, and/or organic solvents which are used suitably as vehicles for the primer composition of this invention include $C_1$–$C_4$ aliphatic alcohols such as methyl alcohol, ethyl alcohol, propyl alcohol, isopropyl alcohol, butyl alcohol, isobutyl alcohol, sec.-butyl alcohol, and tert.-butyl alcohol; polyethylene glycol; ethylene glycol mono-($C_1$–$C_4$) alkyl ethers such as methyl Cellosolve, ethyl Cellosolve and butyl Cellosolve; methyl Cellosolve acetate, ethyl Cellosolve acetate, and butyl Cellosolve acetate; and aliphatic ketones containing $C_1$–$C_4$ alkyl groups, such as acetone, methyl ethyl ketone and methyl isobutyl ketone. These organic solvents may be used alone, but usually, as mixtures in view of the viscosity of the primer, the speed of drying, and other working properties. Ethyl alcohol, isopropyl alcohol, butyl alcohol, isobutyl alcohol, ethyl Cellosolve, and butyl Cellosolve are especially preferred.

The weight ratio of the metal powder component to the alkyl silicate component in the primer composition of this invention is 60:40 to 95:5. If the proportion of the metal powder is less than the above-specified range, heat resistance, rust-proofness and adhesion which are ascribable to the metal powder are difficult to achieve. If, on the other hand, the proportion of the metal powder is larger than the above-specified range, the activity of the alkyl silicate as a binder for the metal powder decreases, and it is difficult to obtain a coating having uniform superior properties. The especially preferred weight ratio of the metal powder to the alkyl silicate is 80:20 to 95:5.

In the application of the primer composition of this invention to the surface of an adherend for undercoating, it is convenient to use it in the form of a dispersion containing the metal powder component present as dispersed in a solution of the alkyl silicate in an organic solvent of the type described hereinabove. The ratio of the metal powder component to the organic solvent can be selected properly in consideration of workability.

If desired, an inorganic filler such as heat-resistant finely divided titanium oxide, silica or alumina may be added to the dispersion so as to adjust the viscosity of the primer dispersion, prevent the sedimentation of the aluminum and zinc powders, and to increase the coatability of the primer composition. The amount of the inorganic filler is up to about 5 parts by weight per 100 parts by weight of the metal powder component. The addition of a small amount of an organic solvent-soluble resin such as polyvinyl butyral can adjust the viscosity of the primer dispersion, increase its coatability, and prevent the sedimentation of the metal powder.

The dispersion is coated on the surface of a substrate by any conventional method, and baked at a temperature of at least 300° C., preferably 350° to 420° C.

Since the primer composition of this invention has the constituents and proportions described hereinabove, coated films obtained from the composition have superior heat resistance, adhesion and hot water resistance and are stable to sulfur compounds at high temperatures. Hence, it is especially suitable as a primer for coating compositions comprising a polyphenylene sulfide resin.

Because of its superior heat resistance, the primer composition of the invention is favorably applied to a metallic substrate, especially an iron substrate. It gives especially superior results and advantages as described hereinabove when the finish coating is a polyphenylene sulfide resin, and the substrate is iron. Metallic products to be coated may be any, and specific examples include pipes, pipe fitting and valves. Products obtained by coating the primer composition of this invention on the inner surface of pipes, pipe fitting or valves made of steel, cast iron or stainless steel, and applying a top coat of a powdery polyphenylene sulfide resin coating composition to the primer constitute very good water supplying lines, especially hot water supplying lines.

Below are given examples of the primer composition of this invention and comparative examples of primer composition outside the scope of this invention.

EXAMPLE 1

One hundred parts by weight of ethyl silicate #40 (a condensate of 5 molecules of a tetraethyl silicate monomer; 40% by weight as $SiO_2$), 50 parts by weight of isobutyl alcohol and 40 parts by weight of ethyl alcohol were well mixed in a glass reactor. Then, with stirring, 1 part by weight of 1 N hydrochloric acid and 9 parts by weight of water were continuously added dropwise over the course of 2 hours. After the addition, the mixture was stirred for 3 hours, and then the stirring was stopped. The mixture was allowed to stand for 20 hours, and aged. The resulting condensate solution (containing 50% by weight of the ethyl silicate condensate) is designated as vehicle I.

Then, 23 parts by weight of vehicle I, 62 parts by weight of granular aluminum having a particle diameter of less than 44 microns, and 15 parts by weight of granular zinc powder having a particle diameter of less than 20 microns were well mixed and dispersed to form a primer composition (I).

EXAMPLE 2

Vehicle I (46 parts by weight), 124 parts by weight of granular aluminum powder having a particle diameter of less than 44 microns, 30 parts by weight of granular zinc powder having a particle diameter of less than 20 microns, 35 parts by weight of a butyl Cellosolve solution of polyvinyl butyral (polyvinyl butyral content, 10% by weight), and 35.5 parts by weight of butyl Cellosolve were well mixed and dispersed to form a primer composition (II).

EXAMPLE 3

A vehicle II (containing 50% by weight of a condensate) was prepared in the same way as in Example 1 except that 100 parts of monomeric tetramethyl silicate was used instead of the ethyl silicate #40, and the amount of water was changed to 17.8 parts by weight. Then, 23 parts by weight of the vehicle II, 62 parts by weight of granular aluminum having a particle diameter of less than 44 microns, and 15 parts by weight of granular zinc powder having a particle diameter of less than 20 microns were well mixed and dispersed to form a primer composition (III).

EXAMPLE 4

A vehicle III (containing about 50% by weight of a condensate) was obtained in the same way as in Example 1 except that 100 parts of monomeric tetrapropyl silicate was used instead of the ethyl silicate #40, and the amount of water was changed to 10.2 parts by weight. Then, 40 parts by weight of the vehicle III, 62 parts by weight of granular aluminum powder having a particle diameter of less than 44, and 15 parts by weight of granular zinc powder having a particle diameter of less than 20 microns were well mixed and dispersed to form a primer composition (IV).

EXAMPLE 5

A vehicle IV (containing about 50% by weight of a condensate) was prepared in the same way as in Example 1 except that 100 parts by weight of monomeric tetrabutyl silicate was used instead of 100 parts by weight of the ethyl silicate #40, and the amount of water was changed to 8.5 parts by weight. Then, 49 parts by weight of the vehicle IV, 62 parts by weight of granular aluminum having a particle diameter of less than 44 microns, and 15 parts by weight of granular zinc having a particle diameter of less than 20 microns were well mixed and dispersed to form a primer composition (V).

EXAMPLE 6

Vehicle I (40 parts by weight), 139 parts by weight of granular aluminum powder having a particle diameter of less than 44 microns, 15 parts by weight of granular zinc powder having a particle diameter of less than 20 microns, 35 parts by weight of a butyl Cellosolve solution of polyvinyl butyral (polyvinyl butyral content, 10% by weight) and 35.5 parts by weight of butyl Cellosolve were well mixed and dispersed to form a primer composition (VI).

EXAMPLE 7

A primer composition (VII) was obtained in the same way as in Example 6 except that 46 parts by weight of granular zinc powder having a particle diameter of less than 20 microns and 108 parts by weight of the granular aluminum powder having a particle diameter of less than 44 microns were used.

EXAMPLE 8

A primer composition (VIII) was prepared in the same way as in Example 6 except that 62 parts by weight of granular zinc having a particle diameter of less than 20 microns and 92 parts by weight of the granular aluminum powder having a particle diameter of less than 44 microns were used.

EXAMPLE 9

A primer composition (IX) was prepared in the same way as in Example 2 except that 120 parts by weight of granular aluminum having a particle diameter of less than 44 microns and 4 parts by weight of flaky aluminum having a particle diameter of less than 44 microns were used instead of 124 parts by weight of the granular aluminum having a particle diameter of less than 44 microns.

EXAMPLE 10

A primer composition (X) was prepared by well mixing 46 parts by weight of the vehicle I, 124 parts by weight of granular aluminum having a particle diameter of less than 44 microns, 30 parts by weight of granular zinc powder having a particle diameter of less than 20 microns, 16.4 parts by weight of silica powder with the particle diameter of primary particles being 8 millimicrons, 36 parts by weight of a butyl Cellosolve solution of polyvinyl butyral (polyvinyl butyral content, 10% by weight), and 45 parts by weight of butyl Cellosolve.

COMPARATIVE EXAMPLE 1

A primer composition (XI) was prepared by well mixing and dispersing 100 parts by weight of a solution of sodium silicate ($Na_2O$ content 10%, $SiO_2$ content 30%), 50 parts by weight of water and 655 parts by weight of granular zinc powder having a particle diameter of less than 20 microns.

COMPARATIVE EXAMPLE 2

A primer composition (XII) was prepared by well mixing and dispersing 100 parts by weight of an aqueous solution of colloidal silica (particle diameter 10 to 20 millimicrons, $SiO_2$ content 20% by weight) and 435 parts by weight of granular zinc having a particle diameter of less than 20 microns.

COMPARATIVE EXAMPLE 3

A primer composition (XIII) was prepared by well mixing and dispersing 23 parts by weight of vehicle I and 80 parts by weight of granular zinc powder having a particle diameter of less than 20 microns.

COMPARATIVE EXAMPLE 4

A primer composition (XIV) was prepared by well mixing 17 parts by weight of 85% phosphoric acid, 5 parts by weight of magnesium oxide (MgO), 5 parts by weight of magnesium phosphate [$Mg(H_2PO_4)_2 \cdot 3H_2O$], 15 parts by weight of magnesium bichromate ($MgCr_2O_7 \cdot 6H_2O$) and 80 parts by weight of water, and then sufficiently dispersing 80 parts by weight of granular aluminum having a particle diameter of less than 44 microns in the mixture.

COMPARATIVE EXAMPLE 5

Vehicle V (containing about 50% by weight of octyl silicate) was prepared in the same way as in Example 1 except that 100 parts by weight of octyl silicate was used instead of 100 parts by weight of the ethyl silicate #40, and the amount of water was changed to 5.0 parts by weight.

Vehicle V (84 parts by weight), 62 parts by weight of granular aluminum having a particle diameter of less than 44 microns, and 15 parts by weight of granular zinc powder having a particle diameter of less than 20 microns were mixed and dispersed to form a primer composition (XV).

COMPARATIVE EXAMPLE 6

A primer composition (XVI) was prepared by well mixing and dispersing 100 parts by weight of a solution of sodium silicate ($Na_2O$ content 10%; $SiO_2$ content 30%), 50 parts by weight of water, 372 parts by weight of granular aluminum having a particle diameter of less than 44 microns and 90 parts by weight of granular zinc having a particle diameter of less than 20 microns.

COMPARATIVE EXAMPLE 7

A primer composition (XVII) was obtained by well mixing and dispersing 100 parts by weight of an aqueous solution of colloidal silica (particle diameter 10 to 20 millimicrons, $SiO_2$ content 20% by weight), 310 parts by weight of granular aluminum having a particle diameter of less than 44 microns, and 75 parts by weight of granular zinc having a particle diameter of less than 20 microns.

Each of the 17 primer compositions prepared in the above examples was coated to a thickness of 20 microns on a steel sheet (150 mm long, 50 mm wide, 3 mm thick) washed with trichloroethylene, and sufficiently dried. The steel sheet was heated at 400° C. for 10 minutes, and then a polyphenylene sulfide resin powder paint was spray-coated onto the primer to a thickness of 300 microns, and baked at 380° C. for 60 minutes. The resulting coated steel sheet was tested for the items shown in Table 1. The results are shown in Table 1.

The cross hatch test was performed by providing cuts on the coating lengthwise and crosswise at intervals of 2 mm, and observing the peeled state. The specimens were either untreated, or dipped for 24 hours in hot water at 110° C.

The crosscut test was performed by providing a crosscut in an untreated specimen so that the two lines each measuring about 70 mm in length crossed at an angle of about 45° at the center of the specimen, observing the peeled state, then dipping the specimen for 24 hours in hot water at 110° C., and observing the peeled state of the specimen after dipping.

Table 1

| | Test item | Cross hatch test | | Crosscut test | |
|---|---|---|---|---|---|
| Primer | | Untreated | After treatment with hot water | Untreated | After treatment with hot water |
| Examples | I | No change | No change | No change | No change |
| | II | " | " | " | " |
| | III | " | " | " | " |
| | IV | " | " | " | " |
| | V | " | " | " | " |
| | VI | " | " | " | " |
| | VII | " | " | " | " |
| | VIII | " | " | " | " |

Table 1-continued

| Primer | Test item | Cross hatch test | | Crosscut test | |
|---|---|---|---|---|---|
| | | Untreated | After treatment with hot water | Untreated | After treatment with hot water |
| | IX | " | " | " | " |
| | X | " | " | " | " |
| | XI | Wholly peeled | Wholly peeled | Considerably peeled at the cut portion | Wholly peeled |
| Comparative | XII | " | " | " | " |
| | XIII | " | " | Peeled at the cut portion | " |
| Examples | XIV | " | " | Considerably peeled at the cut portion | " |
| | XV | Partly peeled | " | Peeled at the cut portion | " |
| | XVI | " | " | " | " |
| | XVII | " | " | " | " |

EXAMPLE 11

The primer composition VI obtained in Example 6 was coated to a thickness of 20 microns on a steel sheet washed with trichloroethylene, and sufficiently dried. It was then baked at 400° C. for 10 minutes to obtain a steel sheet coated with the primer. The steel sheet was preheated to 220° C., and powdery polyethylene (melt index 4, density 0.925) was coated on it by sprinkling, and then heated at 220° C. for 20 minutes to form a coating having a thickness of about 300 microns.

EXAMPLE 12

A coating having a thickness of about 300 microns was obtained in the same way as in Example 11 except that adhesive polyethylene powder (Admer-P, a trademark for a product of Mitsui Petrochemical Industries, Ltd.) was used as the powdery polyethylene, and the heating temperature for the polyethylene coating was adjusted to 210° C.

COMPARATIVE EXAMPLE 8

A coating was obtained by coating powdery polyethylene in the same way as in Example 11 using the primer composition XIII obtained in Comparative Example 3.

COMPARATIVE EXAMPLE 9

A coating was performed by applying powdery polyethylene in the same way as in Example 11 using the primer composition XVI obtained in Comparative Example 6.

COMPARATIVE EXAMPLE 10

A coating was obtained by applying powdery polyethylene in the same way as in Example 12 using the primer composition XIII obtained in Comparative Example 3.

COMPARATIVE EXAMPLE 11

A coating was obtained by applying powdery polyethylene in the same way as in Example 12 using the primer composition XVI obtained in Comparative Example 6.

The coated sheets obtained in Examples 11 and 12 and Comparative Examples 8 to 11 were tested for the same items as shown in Table 1, and the results are shown in Table 2. The temperature of the hot water was 100° C.

Table 2

| Test items No. | Cross hatch test | | Crosscut test | |
|---|---|---|---|---|
| | Untreated | After treatment with hot water | Untreated | After treatment with hot water |
| Example 11 | No change | No change | No change | Not peeled |
| Example 12 | " | " | " | " |
| Comparative Example 8 | Partly peeled | Wholly peeled | Peeled at the cut portion | Wholly peeled |
| Comparative Example 9 | " | " | " | " |
| Comparative Example 10 | No change | Partly peeled | No change | Peeled at the cut portion |
| Comparative Example 11 | " | " | " | " |

What we claim is:

1. A primer coating composition comprising a mixture of more than 50% by weight of aluminum powder and less than 50% by weight of zinc powder, an organic solvent and at least one $C_{1-4}$-alkyl silicate soluble in said solvent, the weight ratio of the metal powder to the alkyl silicate being 60:40 to 95:5 and the weight ratio of the aluminum powder to the zinc powder is 95:5 to 70:30.

2. The composition of claim 1 wherein the aluminum powder is granular and has an average particle diameter of not more than 150 microns, and the zinc powder is granular and has an average particle diameter of not more than 50 microns.

3. The composition of claim 2 wherein the aluminum powder has an average particle diameter of not more than 50 microns, and the zinc powder has an average particle diameter of not more than 10 microns.

4. The composition of claim 1 wherein the weight ratio of the metal powder to the alkyl silicate is 80:20 to 95:5.

5. The composition of claim 1 wherein the alkyl silicate is a condensate obtained by partial hydrolysis of a tetraalkyl silicate.

6. The composition of claim 5 wherein the tetraalkyl silicate is tetraethyl silicate.

7. The composition of claim 1 which is in the form of a dispersion of the metal powder in a solution of the alkyl silicate in an organic solvent.

8. The composition of claim 1 wherein the organic solvent is at least one member selected from the group consisting of $C_1$–$C_4$ aliphatic alcohols, aliphatic ketones containing $C_1$–$C_4$ alkyl groups, and ethylene glycol mono-$C_1$–$C_4$ alkyl ethers.

9. The composition of claim 1 which further contains a titanium oxide powder, silica powder or alumina powder having an average particle diameter of not more than 5 microns in an amount of up to 5 % by weight per 100 parts by weight of the metal powder.

* * * * *